United States Patent
Dazza et al.

(10) Patent No.: US 7,122,064 B2
(45) Date of Patent: Oct. 17, 2006

(54) $Al_2O_3$ AND $ZRO_2$ BASED ABRASIVE GRAIN, METHOD FOR THE PRODUCTION AND USE THEREOF

(75) Inventors: Alessandro Dazza, Villach (AT); Hans Zeiringer, Kappel (AT); Wolfgang Bucar, Laufenburg (DE); Paul Moeltgen, Laufenburg (DE)

(73) Assignee: Treibacher Schleifmittel GmbH, Laufenberg (DE)

( * ) Notice: Subject to any disclaimer, the term of this patent is extended or adjusted under 35 U.S.C. 154(b) by 0 days.

(21) Appl. No.: 10/433,815

(22) PCT Filed: Nov. 29, 2001

(86) PCT No.: PCT/EP01/13972

§ 371 (c)(1),
(2), (4) Date: Oct. 10, 2003

(87) PCT Pub. No.: WO02/46326

PCT Pub. Date: Jun. 13, 2002

(65) Prior Publication Data

US 2005/0022455 A1    Feb. 3, 2005

(30) Foreign Application Priority Data

Dec. 8, 2000  (DE) ................. 100 61 500

(51) Int. Cl.
  *B24D 18/00*   (2006.01)
  *B29B 9/00*    (2006.01)
  *C09K 3/14*    (2006.01)

(52) U.S. Cl. ............... 51/307; 51/308; 51/309; 51/293; 501/103; 501/105; 264/5

(58) Field of Classification Search ............ 51/307, 51/308, 309, 295, 293; 264/5; 501/103, 501/105

See application file for complete search history.

(56) References Cited

U.S. PATENT DOCUMENTS 3,891,408 A * 6/1975 Rowse et al. ............. 51/295
5,143,522 A * 9/1992 Gibson et al. ............ 51/295
5,525,135 A * 6/1996 Moltgen et al. ........... 51/309

* cited by examiner

*Primary Examiner*—Michael Marcheschi
(74) *Attorney, Agent, or Firm*—Connolly Bove Lodg & Hutz, LLP

(57) ABSTRACT

An $Al_2O_3$ and $ZrO_2$ based abrasive grain containing titanium compounds in a reduced form, especially in the form of oxides and/or suboxides and/or carbides and/or oxycarbides and/or oxycarbonitrides and/or suicides, corresponding to a proportion of 0.510 wt. %, expressed as $TiO_2$, containing 20–50 wt. % $ZrO_2$, wherein more than 75 wt. % of the $ZrO_2$ is present in a tetragonal crystal form, having an overall carbon content of 0.03–0.5 wt. %, a proportion of impurities caused by raw materials of less than 3.0 wt. %, wherein the rare earth content calculated in the form of oxides is less than 0.1 wt. %, having an Si-compound content of 0.05–1.0 wt. %, expressed as $SiO_2$, and an $Al_2O_3$ content of 50–80 wt. %, obtained by melting a mixture required for a corresponding abrasive grain composition, said mixture corresponding to $Al_2O_3$, $ZrO_2$, $TiO_2$ and $TiO_2$, and/or raw materials containing the latter in the presence of a surplus of a reducing agent and quenched in such a way that the melt is fully solidified in less than 10 seconds. The invention also relates to a method for the production thereof and the use thereof in abrasives.

19 Claims, No Drawings

$Al_2O_3$ AND $ZrO_2$ BASED ABRASIVE GRAIN, METHOD FOR THE PRODUCTION AND USE THEREOF

The invention at hand relates to an abrasive grain on the basis of $Al_2O_3$ and $ZrO_2$ with a contents of titanium compounds in reduced form, in particular in the form of oxides and/or suboxides and/or carbides and/or oxycarbides and/or oxycarbonitrides and/or suicides between 0.5 and 10 wt. %, expressed as $TiO_2$; a contents of $ZrO_2$ between 20 and 50 wt. %, with more than 75 wt. % of the $ZrO_2$ being present in its tetragonal crystal form; an overall carbon contents between 0.03 and 0.5 wt. %; a portion of raw-material caused impurities of less than 3.0 wt. %, with the contents of rare earths calculated as oxides amounting to less than 0.1 wt. %; a contents of Si compounds between 0.05 and 1.0 wt. %, expressed as $SiO_2$; and a contents of $Al_2O_3$ between 50 and 80 wt. %, obtainable by melting a mixture necessary for the corresponding composition of the abrasive grain of $Al_2O_3$, $ZrO_2$, $TiO_2$ and $SiO_2$ and/or of raw materials containing the latter, in the presence of an excess of a reducing agent, and quenching it in such a way that the melt fully solidifies in fewer than 10 seconds.

Abrasive grains on the basis of $Al_2O_3$ and $ZrO_2$ produced through the extremely rapid cooling of a melt of $Al_2O_3$ and $ZrO_2$ have been known for approximately 40 years. In selected grinding processes they distinguish themselves through particularly advantageous abrasive properties.

For example, a zirconium corundum abrasive grain is described in U.S. Pat. No. 3,981,408 that is cooled down extremely fast by pouring a melt of $Al_2O_3$ and $ZrO_2$ produced under reducing conditions between metal plates which prevents a segregation of the components and which permits the stabilization of an extremely fine crystallite structure and, at the same time, of a certain portion of tetragonal high-temperature modification of the $ZrO_2$. Due to the microcrystalline structure, the zirconium corundum produced in this fashion is particularly well suited for use in abrasives since, on the one hand, it is of high toughness and thus of great sturdiness, and, at the same time, it has a tendency, under the corresponding high stress during the grinding process, to form new cutting edges through the breaking off of smaller segments from the abrasive grain which is fostered and made possible through the microcrystalline structure. These new cutting edges in turn intervene in the grinding process which leads to a cool and thereby material-friendly grinding as well as a high abrasion yield. According to U.S. Pat. No. 3,891,408, the contents of $SiO_2$ should be as low as possible. $TiO_2$ is viewed as less damaging.

In the past, it has been tried again and again to further improve the performance of the zirconium corundum abrasive grains through diffusions and variations of the quenching process and the degree of reduction.

For example, a zirconium corundum is described in DE-A-3 040 992 with a portion of $ZrO_2$ of 27 to 35 wt. % which also contains, expressed as $TiO_2$, 1 to 10 wt. % of oxycarbides, carbides and/or suboxides of titanium which are obtained through reduction of $TiO_2$ with coal during the melting process. The abrasive performance of this abrasive grain is characterized as equal or superior to that of the abrasive grain described in U.S. Pat. No. 3,891,408. However, the advantage of this abrasive grain is seen, above all, in the lowering of the production costs while providing a comparable abrasion performance which is obtained through a reduction of the $ZrO_2$ portion. In DE-A-3 040 992, the assumption is expressed that the direct influence on the grinding process by the Ti compounds generated by the reduction is responsible for the improvement of the properties of the abrasive grain.

In U.S. Pat. No. 5,143,522 an abrasive grain is described, with a contents of $ZrO_2$ of 20 to 50 wt. %, of which more than 25 wt. % are present in its tetragonal form, 1 to 10 wt. % of reduced titanium oxide in the form of suboxides, carbides and oxycarbides, 0.3 to 0.5 wt. % carbon, less than 3 wt. % of impurities, and $Al_2O_3$ as its main component. The structure of the abrasive grain is described as deposits of primary $Al_2O_3$ crystals in a eutectic aluminum oxide/zircon oxide matrix. The size of the primary crystals lies between 5 and 50 μm. The share of $ZrO_2$ in the tetragonal crystal form amounts to up to 75 wt. % relative to the overall contents of $ZrO_2$. Viewed as harmful impurities are, above all, $Na_2O$, whose contents should not exceed 0.1 wt. %, and $SiO_2$, whose contents should not exceed 1 wt. %, while ideally lying below 0.1 wt. %. Other raw-material related impurities mentioned are MgO, CaO and $Fe_2O_3$, whose contents should not exceed 1.5 wt. %.

Contrary to the above-mentioned publication and to U.S. Pat. No. 3,891,408 as well as to the general opinion of the experts, GB-A-2 011 880 describes a zircon corundum on the basis of bauxite and baddeleyite containing up to 2.5 wt. % $TiO_2$ which contains between 1.1 and 2.0 wt. % $SiO_2$ and which is said to be advantageous for certain uses vis-á-vis the materials made from purer raw materials. The essential difference with all other processes described here is the fact that inexpensive bauxite is used directly as the raw material. However, when using bauxite as a raw material for zircon corundum, large amounts of impurities need to be reduced (bauxite always contains, above all, larger amounts of iron mineral, in addition to titanium compounds and quartz or, respectively, silicates). In contrast with DE-A-3 040 992, with U.S. Pat. No. 5,143,522 and even with EP-B-0 595 081 mentioned later, in the process according to GB-A-2 011 880 the coal for the reduction of the impurities is used up, presumably leading to the formation of an alloy of metallic iron and silicon. The high contents of more than 1% $SiO_2$ in the products described points at the fact that the work was done with relatively small amounts of coal as a reduction agent, which means that a major difference with the publications described above lies simply in the fact that presumably titanium is not present in the product in its reduced forms that are responsible for the stabilization of the tetragonal $ZrO_2$ modifications and which have abrasion-active properties.

In U.S. Pat. No. 4,457,767 a zircon corundum abrasive grain is described that contains between 0.1 and 2% of yttrium oxide which serves to stabilize the tetragonal high-temperature modification. In contrast with the stabilization with $TiO_2$, our own tests have shown that the viscosity of the melt is influenced little or not at all through the addition of $Y_2O$. In comparison with the melts in which $TiO_2$ is used as stabilizer for the tetragonal $ZrO_2$ modification, this provides the advantage that a rapid quenching of the melt and the realization of an extremely fine structure is possible without any hindrance. However, this disadvantage for the Ti-containing zircon corundum is compensated for by the abrasion-active effect of the reduced Ti compounds.

Japanese patent JP-A-1 614 974 describes a titanium-containing zircon corundum that also contains $Y_2O_3$ with which the high-temperature modification of the $Y_2O_3$ is stabilized.

In EP-B-0 595 081 on which the invention is based an abrasive grain is described with a contents of titanium compounds in the form of suboxides, carbides and/or oxycarbides in which more than 90 wt. % of the $ZrO_2$ are present in its tetragonal modification and which is obtained by quenching the melt to complete solidification in fewer than 10 seconds. Stabilization of the tetragonal high-temperature modification of the $ZrO_2$ is reached in this case without any addition of $Y_2O_3$ and only through stabilization with the aid of the reduced titanium compounds and through rapid quenching.

Methods for a quick quenching of oxide melts are described, for example, in U.S. Pat. No. 3,993,119, U.S. Pat. No. 4,711,750, and in EP-B-0 593 977.

All methods and materials described above had as their objective to satisfy the demand by users for an abrasive grain with even higher abrasion performances and more favorable abrasion behavior, in particular for the treatment of various kinds of steel. While the methods and materials mentioned have proved their mettle in the past, they can not meet the increased demands of the manufacturers of abrasives or, respectively, of their clients, for further performance improvements and an even more efficient use of the abrasives.

The task of the invention is therefore to make available a zircon corundum abrasive grain that for the treatment of a wide variety of materials, in particular of the most varied kinds of steel, represents an improvement in terms of performance as compared with the state of the art.

This task is solved by providing an abrasive grain on the basis of $Al_2O_3$ and $ZrO_2$ with a contents of titanium compounds in a reduced form, in particular in the form of oxides and/or suboxides and/or carbides and/or suicides, between 0.5 and 10 wt. %, expressed as $TiO_2$; a contents of $ZrO_2$ between 20 and 50 wt. %, with more than 75 wt. % of the $ZrO_2$ being present in its tetragonal crystal form; with an overall carbon contents of between 0.03 and 0.5 wt. %; a portion of raw-material caused impurities of less than 3.0 wt. %, with the contents of rare earths calculated as oxides amounting to less than 0.1 wt. %; a contents of Si compounds between 0.05 and 1.0 wt. %, expressed as $SiO_2$; and a contents of $Al_2O_3$ between 50 and 80 wt. %, obtainable by melting a mixture necessary for the corresponding composition of the abrasive grain of $Al_2O_3$, $ZrO_2$, $TiO_2$ and $SiO_2$ and/or of raw materials containing the latter, in the presence of an excess of a reducing agent, and quenching it in such a way that the melt fully solidifies in fewer than 10 seconds.

The abrasive grain distinguishes itself through the fact that abrasives manufactured with this abrasive grain yield increases in the abrasion performance of up to 50% and more in the treatment of a wide variety of materials, in particular of the most varied kinds of steel, as compared with the known abrasives on the basis of zircon corundum, under comparable and/or the same test parameters.

In a preferred abrasive grain according to the invention, the amount of reduced titanium compounds lies between 2 and 5 wt. %, and/or the amount of tetragonal $ZrO_2$ modification at not less than 85 wt. %, preferably at not less than 90 wt. %. Also, the amount of impurities in the abrasive grain is below 1 wt. %, and/or the amount of Si compounds between 0.2 and 0.7 wt. %.

Surprisingly, it was found that, in analogy with EP-B-0 595 081, during the manufacturing of an abrasive corundum on the basis of $Al_2O_3$, and $ZrO_2$, an abrasive grain can be obtained through the purposeful addition of $SiO_2$—containing compounds during the melting process that is clearly superior to the zircon corundum known so far.

This was all the more surprising since during the manufacturing of abrasive grains on the basis of corundum, $SiO_2$ impurities are usually avoided because the silicates formed during the melting process do not possess any outstanding grinding properties and thus reduce the performance of the abrasive grain. In the production of zircon corundum abrasive grains, too, the general trend among experts was to employ the purest possible raw materials and to keep the contents of impurities as low as possible. Only for cost reasons or for reasons of availability did one resort to more strongly contaminated raw materials. Therefore, the zircon corundum and abrasive grains themselves that are available on the market are relatively pure products; however, as a rule they contain between 0.02 and 0.3 wt. % $SiO_2$; but a dependence of the performance on the $SiO_2$ contents can not be gleaned from the relevant underlying publications; instead, it is—as mentioned at the onset—regarded as rather detrimental. In most commercial products the contents lies at approximately 0.2 wt. %. Only the product made by the registrant in accordance with EPB-0 595 081 shows a clearly lower contents of $SiO_2$, which lies at approximately 0.02 wt. %. A correlation between $SiO_2$ contents and the performance potential of the abrasive grain is not indicated in EP-B 0 595 081.

In the production process of the abrasive grain, for example, a mixture of 50 to 80 wt. % of $Al_2O_3$, preferably alum earth, and 20 to 50 wt. % $ZrO_2$ in the form of baddeleyite, zircon concentrate and/or zircon sand in the presence of 0.5–10 wt. % $TiO_2$ which is preferably used in the form of rutile, and 0.5 to 5 wt. % $SiO_2$ which is preferably added to the mixture in the form of zircon sand, is melted in the electric arc furnace under reducing conditions in the presence of 0.5–5 wt. % coal. The molten mixture is then quenched as quickly as possible, which can be achieved by pouring the melt in accordance with EP-B-0 593 977 into a narrow fissure between metal plates, with the liquid material completely solidifying within a few seconds, preferably in fewer than 5 seconds, and particularly preferably in fewer than 3 seconds. The gap between the metal plates that is formed by corresponding recesses in metal plates assembled to a plate packet, has a width of 1 to 10 mm, preferably 2 to 5 mm. The cooling plate packet that during the pouring of the melt is guided with a defined speed below the pouring lip of the furnace vessel has a starting temperature of approximately 100 to 500° C. Following the pouring, the temperature of the cooling plate packet has increased by approximately 50–100° C. due to the filling of the gaps with 2000° C. hot melt, causing the cooling plate packet to be driven to a so-called cooling zone after being emptied, where it is sprayed with water to bring it back to the preset starting temperature. The cooling plate packet is then put in its starting position for the next pouring action which can be started as soon as enough melt is present in the furnace vessel.

However, in addition to the above-described process for the quenching of the liquid melt which corresponds to the method described in EP-B-0 593 977, any other suitable state-of-the-art method for a quick quenching of liquid oxide melts may be used, for example the methods described in US patents U.S. Pat. No. 3,993,119 and U.S. Pat. No. 4,711,750.

For the production of the abrasive grain in accordance with the invention, alum earth, zircon concentrate, zircon sand and rutile are used preferably as raw materials, with the raw-material mixture preferably being chosen in such a way that the end product contains a preponderance of a eutectic mixture of $ZrO_2$ and $Al_2O_3$, with an $Al_2O_3$ contents of approximately 55–65 wt. %, a $ZrO_2$ contents of approximately 35–45 wt. %, each relative to the overall contents of $Al_2O_3$ and $ZrO_2$.

The carbon contents of the product lies between 0.03 and 0.5 wt. %, while between 0.5 and 5 wt. %, preferably 1 to 4 wt. %, are used in the starting mixture. That means that a large portion of the coal is used up during the melting process for the stabilization of the reducing conditions in the melt, for the reduction of the $TiO_2$ and for the reduction of the $SiO_2$, escaping during this process to a large part as CO. The relatively low contents of $SiO_2$ in the product, with comparatively large amounts in the starting mixture, indicates that under the chosen reducing conditions $SiO_2$ is reduced to a large part to SiO and vaporized, and only a small portion is reduced to silicides and/or other Si compounds. Any reduction to metallic Si that should then be deposited at the bottom of the furnace together with other metallic impurities that were formed from the oxides through reduction in the raw material will be low.

As in EP-B-0 595 081, the Ti compounds, possibly suboxides or other reduction products of titanium formed during the reduction, cause a stabilization of the tetragonal high-temperature modification of the $ZrO_2$, leading, in combination with the above-described effective quenching of the melt, to a very high contents of tetragonal $ZrO_2$ modification in the product.

However, upon a comparison with materials that are identical with the abrasive grain in accordance with the invention, down to the $SiO_2$ contents in the melt and in the end product, and that are melted and quenched in accordance with the same method, it becomes conspicuous that with the use of $TiO_2$ for the stabilization of the tetragonal $ZrO_2$, the addition of $SiO_2$ clearly behaves counterproductively for a stabilization of the tetragonal $ZrO_2$ modification, and that the product in accordance with the invention, with otherwise the same starting mixture, shows a lower contents of tetragonal $ZrO_2$ modification than a comparable abrasive grain with a lower $SiO_2$ contents. EP-B-0 595 081 now teaches us that the best abrasion results are achieved with abrasive grains that have a tetragonal $ZrO_2$ modification contents of at least 90 wt. % relative to the overall $ZrO_2$ contents. It was all the more surprising that in spite of a comparatively reduced $ZrO_2$ modification contents, clearly better results could be achieved with the abrasive grains according to the invention for all areas of application that were tested than with the corresponding state-of-the-art abrasive grains that showed a higher contents of tetragonal $ZrO_2$ modification. As a matter of principle, however, it is true also with respect to the abrasive grain in accordance with the invention that a high contents of tetragonal phase will yield abrasion-technological advantages. For example, the portion of tetragonal phase may be increased again through the addition of $TiO_2$ which indicates that it is possible that initially at least part of the $SiO_2$ reacts in the melt with $TiO_2$, e.g. to form Ti silicides, thereby lowering the share of the reduced Ti compound(s) that is (are) responsible for the stabilization of the tetragonal $ZrO_2$ modification. By increasing the $TiO_2$ share, this portion can be increased again. In doing so, it comes as a surprise that it is possible to increase the contents of tetragonal $ZrO_2$ phase again, without increasing the viscosity of the melt to such a degree that the quenching performance of the melt deteriorates again.

An explanation of this behavior may be found in the physical properties of the melt itself which is altered through the presence of $SiO_2$. Thus, it can be seen that the viscosity of the melt which increases through the formation of poorly soluble and high-melting titanium compounds in the course of the melting process under reducing conditions, with an increasing titanium oxide contents, can be lowered again by adding $SiO_2$ which, e.g., facilitates the pouring of the liquid melt into a relatively narrow gap between metal plates. The faster the liquid melt can be poured between the cooling plates, the faster the quenching of the melt will proceed, and the finer the structure that can be stabilized in the product.

Structure tests carried out on the abrasive grain according to the invention in accordance with examples 1 through 10 and comparative examples 1 and 2 speak in favor of the theory that, in addition to a high contents of tetragonal $ZrO_2$ phase and the presence of titanium compounds in the form of oxides and/or suboxides and/or carbides and/or oxycarbides and/or oxycarbonitrides and/or silicides, it is, above all, the structure of the abrasive grain that is responsible for its performance potential. The finer the structure, the more effective will be the corresponding abrasive grain. The structure tests were carried out by means of back scatter images with a scanning electron microscope and by way of polished grindings. It turned out that with the optimally cooled down materials, the eutectic mixture of $Al_2O_3$ and $ZrO_2$, has such a fine structure even at 10,000-fold magnification that the size of the individual precipitations which lies below 0.1 μm can no longer be detected accurately via back scatter electron images in a scanning electron microscope. But what is clearly recognizable in all tested samples are the individual dendritic eutectic areas which have a domain-like configuration, with the cross section of the dendritic eutectic domains decreasing in tandem with the decrease in the size of the individual precipitations of $Al_2O_3$ and $ZrO_2$. The dendritic eutectic domains themselves lie within a magnitude of a few micrometers and more and can therefore be measured by means of electron microscopic images and be used for the characterization of the structure of the abrasive grains. Corresponding measurements were carried out within the framework of these works during which it was detected that the median cross section of the measured dendrites of all reference examples lies below 20 μm, and of the preferred versions below 15 μm, and that they thus have a clearly finer structure than comparative example 1 which was melted without the addition of $SiO_2$. The results have been summarized in Table 2.

From the grinding tests summarized in Tables 3 through 5 it can be deduced that the performance potential of the abrasive grain increases when the structure becomes finer and finer. At the same time, it has been known from EP-B-0 595 081—and it can be repeated in accordance with the grinding tests—that a high contents of tetragonal $ZrO_2$ phase has a favorable effect on the performance potential; however, this effect stays within limits in the examples at hand since all examples cited already have a relatively high contents of tetragonal phase.

The objective of the invention is therefore solved by finding the optimal combination of Ti compounds and Si compounds for the production of a high-quality zircon corundum abrasive grain.

The effect of the titanium compounds on the grinding performance is of a complex nature. For example, $TiO_2$ is initially used for the stabilization of the tetragonal $ZrO_2$ phase. However, the decisive factor in this is the fact that the work is carried out under reducing conditions since tests without any reduction agents proved that one or several of the reduced titanium compounds is/are obviously responsible for the stabilization of the tetragonal $ZrO_2$ phase, which can also be seen in example 3 in EP-B-0 595 081 in which, among others, zircon corundum melt with added titanium oxide was quenched without the addition of any reduction agent. Corresponding tests that confirmed this result were also carried out within the scope of this work. The question of what titanium compounds are ultimately responsible for the stabilization is the subject of further studies that have not yet been concluded. But it is quite obvious that the titanium compounds that are formed during the melting process under reducing conditions in the presence of coal, such as titanium carbide, titanium oxycarbide, titanium carbonitride, and others, also have a positive influence on the abrasion performance which could possibly be explained by the great hardness of those compounds. However, in addition to that, the extremely poorly soluble and high melting titanium compounds alter the viscosity of the melt and thereby the cooling behavior of the melt as well. A melt with a high viscosity can, e.g., be poured only with difficulty into a narrow gap between metal plates; in addition, the coating of the metal with liquid melt deteriorates, which in turn hampers the heat transfer und thereby a quick cooling. The addition of $SiO_2$ reduces the viscosity of the melt, but at the same time—possibly due to the formation of titanium silicides—the equilibrium of the titanium compounds being formed is shifted, which obviously affects the compound responsible for the stabilization of the tetragonal $SiO_2$ phase. An increase of the $TiO_2$ contents allows to shift the equilibrium again in such a way that high portions of tetragonal $ZrO_2$ phase are possible again, surprisingly without increasing the viscosity of the melt to such a degree that the quality of the quenching of the melt or, respectively, the structure of the product deteriorates. While a further increase of the $TiO_2$ portion permits the stabilization of even higher portions (100%) of tetragonal $ZrO_2$ phase, the viscosity of the melt is simultaneously increased to such a degree that overall a deterioration of the product results due to the coarser structure which in turn may be attributed to the inferior cooling conditions.

Another and/or additional possible explanation for the surprisingly good abrasion results is the formation of a glass phase in the abrasive grain which increases the wear resistance of the abrasive grain in accordance with the invention.

In the following the present invention is explained in detail, without this constituting any limitation.

EXAMPLE 1

A mixture of 335 alum earth (AC34, firm of Pechney, Gardanne), 232 kg of baddeleyite concentrate (firm of Foskor, South Africa), 16 kg of petrol coke, 16 kg of rutile, and 10 kg of zircon sand with a composition of 66.6% $ZrO_2$, 32.5% $SiO_2$, 0.32% $Al_2O_3$, 0.1% $Fe_2O_3$ and 0.14% of $TiO_2$ was melted in an electric arc furnace. The furnace vessel had a diameter of approximately 2 m, the voltage was 110 V, and the load was selected at 1,500 kWh. The mixture was charged in such a way that after approximately one hour the entire mixture had melted and could be quenched in accordance with a method as per EP-B-0 593 977. The starting temperature for the cooling plates amounted to approximately 300° C. and the gap between the metal plates had a width of 3 to 5 mm. Previous tests had shown that under these conditions the material completely solidified only 3 seconds after being poured between the cooling plates. Approximately 1 minute after the pouring, the plate packet reaches a device for evacuation in which the solidified and cooled down material is removed from the plate packet, and collected. At the time of the evacuation the solidified material still had a temperature of approximately 350° C. Following a complete cooling down, the material can be crushed in the usual manner (for example by jaw crushers, rolling crushers, roller mills or similar crushing aggregates) and subsequently be treated for graining by way of proper sifting.

EXAMPLES 2 THROUGH 10

The production of the zircon abrasive grains occurred in analogy with Example 1. However, the addition of zircon sand and, correspondingly, the portion of baddeleyite concentrate was varied. In addition, the rutile contents was varied as well. Table 1 shows the starting mixtures of zircon sand, baddeleyite concentrate and rutile necessary for the various model variations of the abrasive grain according to the invention shown in Examples 2 through 10. The amounts of alum earth and petrol coke were not altered as compared with Example 1 and are therefore not shown separately in the following table.

TABLE 1

Starting mixtures for Examples 2–10 (without $Al_2O_3$ and petrol coke whose portions remained unchanged in all runs)

| Abrasive Grain | Zircon Sand | Baddeleyite Concentrate | Rutile |
|---|---|---|---|
| Example 2 | 20 kg | 228 kg | 16 kg |
| Example 3 | 40 kg | 228 kg | 16 kg |
| Example 4 | 80 kg | 206 kg | 16 kg |
| Example 5 | 120 kg | 195 kg | 16 kg |
| Example 6 | 40 kg | 228 kg | 22 kg |
| Example 7 | 60 kg | 214 kg | 28 kg |
| Example 8 | 80 kg | 206 kg | 22 kg |
| Example 9 | 80 kg | 206 kg | 28 kg |
| Example 10 | 80 kg | 206 kg | 40 kg |

For a direct comparison with the state of the art, the comparative examples listed in the following were produced under the same conditions as Examples 1–10. In their chemical compositions, their physical properties and their abrasion-technological properties, the comparative examples thus correspond to the state-of-the-art materials with the best performance currently available on the market.

COMPARATIVE EXAMPLE 1

Production occurred in analogy with Example 1. However, no zircon sand was added. The starting mixture contained 335 kg of alum earth, 235 kg of baddeleyite concentrate, 16 kg of rutile and 16 kg of petrol coke.

COMPARATIVE EXAMPLE 2

Production occurred in analogy with Example 2. However, no rutile was added, instead, stabilization of the tetragonal $ZrO_2$ modification was achieved by adding 5 kg of $Y_2O_3$.

The chemical analyses of the most important components of the abrasive grains of the reference examples and of the comparative examples have been compiled in Table 2. The portions of $Al_2O_3$ and $ZrO_2$ were selected in each case in such a way that the mixture was as close to the eutectic system for $Al_2O_3$ and $ZrO_2$ as possible, meaning that for all examples, the contents of $Al_2O_3$ and $ZrO_2$ was nearly identical and in each individual case lay between 55 and 59 wt. % for $Al_2O_3$ and, respectively, between 39 and 42 wt. % for $ZrO_2$. Within these narrow limits, none of the possible variations in the share of the main components $Al_2O_3$ and $ZrO_2$ has any discernible impact on product quality, and they are therefore not listed in Table 2 either.

In addition, the portions of tetragonal $ZrO_2$ modification relative to the overall contents of $ZrO_2$ are listed in Table 2. The portions of tetragonal $ZrO_2$ modification is calculated according to the equation $$T(wt.\ \%) = \frac{2t \times 100}{2t \times m_1 + m_2}$$

which is based on the radio diffraction analysis of zircon corundum powders (radio powder diffractogram), with t denoting the intensity of the peak of the tetragonal modification at a diffraction angle of 2 theta=30.3, $m_1$ denoting the intensity of the peak of the monocline modification at a diffraction angle of 2 theta=28.3, and $m_2$ denoting the peak of the monocline modification at a diffraction angle of 2 theta=31.5. The intensity itself was determined via the integral of the peak area.

Annotations re Table 2 (See Below):

TABLE 2

Characterization of the various reference examples and comparative examples

| Abrasive Grain | Chem. Analysis | Share of tetragonal ZrO$_2$ modification | Structure (median cross section of the dendritic eutectic domains)[1] |
|---|---|---|---|
| Example 1 | TiO$_2$ = 2.45%<br>SiO$_2$ = 0.08% | 87% | 12 μm |
| Example 2 | TiO$_2$ = 2.52%<br>SiO$_2$ = 0.21% | 84% | 10 μm |
| Example 3 | TiO$_2$ = 2.50%<br>SiO$_2$ = 0.32% | 82% | 11 μm |
| Example 4 | TiO$_2$ = 2.46%<br>SiO$_2$ = 0.45% | 78% | 9 μm |
| Example 5 | TiO$_2$ = 2.56%<br>SiO$_2$ = 0.78% | 72% | 9 μm |
| Example 6 | TiO$_2$ = 3.25%<br>SiO$_2$ = 0.29% | 91% | 17 μm |
| Example 7 | TiO$_2$ = 4.26%<br>SiO$_2$ = 0.32% | 94% | 19 μm |
| Example 8 | TiO$_2$ = 3.36%<br>SiO$_2$ = 0.48% | 89% | 12 μm |
| Example 9 | TiO$_2$ = 4.26%<br>SiO$_2$ = 0.49% | 95% | 12 μm |
| Example 10 | TiO$_2$ = 6.31%<br>SiO$_2$ = 0.48% | 100% | 18 μm |
| Comparative Example 1* | TiO$_2$ = 2.48%<br>SiO$_2$ = 0.02% | 93% | 24 μm |
| Comparative Example 2** | TiO$_2$ = 0.08%<br>Y$_2$O$_3$ = 0.85%<br>SiO$_2$ = 0.24% | 92% | 12 μm |

*Comparative example 1 corresponds to a commercially available, state-of-the-art zircon corundum in accordance with EP 0 595 081 B1.
**Comparative example 2 corresponds to a commercially available, state-of-the-art zircon corundum in accordance with U.S. Pat. No. 4,457,767.
[1]The median cross section of the dendrites was determined by measuring back scatter electron images at 500-fold magnification of zircon corundum platelets with a median cross section of 3 mm that were sharpened lengthwise to the growth direction of the dendrites. The zircon corundum platelets themselves were obtained by pouring the liquid melt into a gap between metal plates with a median gap width of 3 mm, with the growth of the dendrites proceeding vertically from the cooling plate into the interior of the poured and solidified zircon corundum platelet.

The abrasive grains listed in Table 2 were used to conduct grinding tests that are explained in detail below, and summarized in Tables 3 through 5.

TABLE 3

Test results of belt grinders against work pieces ST 37 (grinding time 12 min) and V2A (grinding time 30 min), each with a P40 graining according to FEPA
Grinding Test 1

| | Abrasion Performance | |
|---|---|---|
| Abrasive Grain | Steel Pipe (ST37) | V2A Surface |
| Example 1 | 541 g = 115% | 375 g = 108% |
| Example 2 | 621 g = 132% | 396 g = 114% |
| Example 3 | 668 g = 142% | 424 g = 122% |
| Example 4 | 603 g = 134% | 379 g = 109% |
| Example 5 | 499 g = 106% | 361 g = 104% |

TABLE 3-continued

Test results of belt grinders against work pieces ST 37 (grinding time 12 min) and V2A (grinding time 30 min), each with a P40 graining according to FEPA
Grinding Test 1

| | Abrasion Performance | |
|---|---|---|
| Abrasive Grain | Steel Pipe (ST37) | V2A Surface |
| Example 6 | 582 g = 124% | 400 g = 115% |
| Example 7 | 555 g = 118% | 403 g = 116% |
| Example 8 | 658 g = 140% | 449 g = 129% |
| Example 9 | 677 g = 144% | 459 g = 132% |
| Example 10 | 503 g = 107% | 393 g = 113% |
| Comparative Example 1 | 470 g = 100% | 348 g = 100% |
| Comparative Example 2 | 461 g = 98% | 361 g = 104% |

TABLE 4

Test results of belt grinders C45 and V2A (in each case, solid material, 30 mm diameter)/contact pressure 35 N/grinding time 50 minutes
Grinding Test 2

| | | Abrasion Performance | |
|---|---|---|---|
| Abrasive Grain | Graining | C45 | V2A |
| Example 1 | P36 | 2953 g = 105% | 890 g = 112% |
| | P50 | 2269 g = 114% | 712 g = 109% |
| Example 2 | P36 | 3571 g = 127% | 930 g = 117% |
| | P50 | 2428 g = 122% | 888 g = 136% |
| Example 3 | P36 | 3684 g = 131% | 1097 g = 138% |
| | P50 | 2527 g = 127% | 966 g = 148% |
| Example 4 | P36 | 3599 g = 128% | 1065 g = 134% |
| | P50 | 2607 g = 131% | 803 g = 123% |
| Example 5 | P36 | 2896 g = 103% | 779 g = 98% |
| | P50 | 2109 g = 106% | 660 g = 101% |
| Example 6 | P36 | 3627 g = 129% | 970 g = 122% |
| | P50 | 2666 g = 134% | 728 g = 115% |
| Example 7 | P36 | 3065 g = 109% | 890 g = 112% |
| | P50 | 2267 g = 114% | 718 g = 110% |
| Example 8 | P36 | 4077 g = 145% | 1097 g = 138% |
| | P50 | 2706 g = 136% | 914 g = 140% |
| Example 9 | P36 | 3965 g = 141% | 1167 g = 147% |
| | P50 | 2647 g = 133% | 993 g = 152% |
| Example 10 | P36 | 2868 g = 102% | 898 g = 113% |
| | P50 | 2249 g = 113% | 764 g = 117% |
| Comparative Example 1 | P36 | 2812 g = 100% | 795 g = 100% |
| | P50 | 1990 g = 100% | 653 g = 100% |
| Comparative Example 2 | P36 | 2792 g = 99% | 783 g = 98% |
| | P50 | 1908 g = 96% | 705 g = 108% |

TABLE 5

Test results of belt grinders SUS 304 (grinding time 5 min) and S 50 C (grinding time: 30 min)/P40 graining according to FEPA
Grinding Test 3

| | Abrasion Performance | |
|---|---|---|
| Abrasive Grain | SUS 304 Stainless Steel High Stress | S 50 C Construction Steel Medium Stress |
| Example 1 | 541 g = 123% | 2120 g = 107% |
| Example 2 | 621 g = 127% | 2080 g = 105% |
| Example 3 | 542 g = 138% | 2311 g = 116% |
| Example 4 | 603 g = 135% | 2267 g = 114% |
| Example 5 | 415 g = 104% | 1941 g = 98% |
| Example 6 | 495 g = 124% | 2219 g = 112% |
| Example 7 | 555 g = 108% | 2020 g = 102% |
| Example 8 | 547 g = 137% | 2536 g = 128% |

TABLE 5-continued

Test results of belt grinders SUS 304 (grinding time 5 min)
and S 50 C (grinding time: 30 min)/P40 graining
according to FEPA
Grinding Test 3

| Abrasive Grain | SUS 304 Stainless Steel High Stress | Abrasion Performance S 50 C Construction Steel Medium Stress |
|---|---|---|
| Example 9 | 567 g = 142% | 2833 g = 143% |
| Example 10 | 431 g = 108% | 2199 g = 111% |
| Comparative Example 1 | 399 g = 100% | 1981 g = 100% |
| Comparative Example 2 | 423 g = 106% | 2056 g = 104% |

As can be seen from the examples, increases of the abrasion performance of up to approximately 50% and more are achieved with abrasives produced with this abrasive grain in the treatment of a wide range of materials while maintaining comparable and/or the same test parameters as compared with the abrasives known so far on the basis of zircon corundum. This applies in particular to flexible zircon corundum abrasives such as grinding belts and abrasive paper that were mostly used for the aforementioned tests.

However, no limitation of the invention is to be seen therein. Additional tests with other materials and abrasive types have shown that the abrasive grain according to the invention yields advantages for other application areas as well that are therefore to be covered by the claims set forth below as contemplated by the invention.

The invention claimed is:

1. A process for making alumina-zirconia abrasive grain product comprising:
   forming a melt from a mixture of source materials containing aluminum oxide, zirconium oxide, titanium oxide and silicon oxide in the presence of excess carbon as a reducing agent wherein the amount of silicon oxide is from 2.0 to 5.7 wt-% relative to all of the source materials; and
   quenching the melt to produce the abrasive grain product comprising:
   (a) aluminum oxide;
   (b) zirconium oxide with at least 85 wt.-% thereof being in tetragonal crystal form;
   (c) titanium compounds in reduced form of oxide, suboxides, carbides, oxycarbides, oxycarbonitrides, silicides or mixtures thereof present from 2–5 wt.-%;
   (d) silicon compounds content, expressed as silicon oxide, between 0.2 and 0.7 wt-%;
   (e) overall carbon content between 0.03 and 0.5 wt.-%,
   (f) impurities content derived from source materials being less than 3 wt.-% and rare earths content, expressed as oxides, of less than 0.1 wt.-%, and
   (g) the abrasive grain having an extremely fine structure with dentritic eutectic domains of aluminum oxide and zirconium oxide with a median cross section of less than 15 microns.

2. The process according to claim 1 wherein the amount of the impurities from the source materials is below 1 wt. %.

3. The process according to claim 1 wherein 35–45 wt. % of the $ZrO_2$ and 55–65 wt. % of the $Al_2O_3$, are present in the eutectic composition.

4. The process according to claim 1 wherein the liquid melt is quenched to completely solidified form in fewer than 5 seconds.

5. The process according to claim 1 wherein alum earth is used as source material for $Al_2O_3$.

6. The process according to claim 1 wherein the source materials for $ZrO_2$ are selected from baddeleyite, zircon sand, man-made zircon concentrates or a mixture thereof.

7. The process according to claim 1 wherein rutile is used as source material for $TiO_2$.

8. The process according to claim 1 wherein the source materials for $SiO_2$ are selected from quartz, mullite, zircon sand or a mixture thereof.

9. Method of producing a flexible abrasive comprising disposing the grain produced by the process of claim 1 on a flexible substrate and adhering the abrasive thereto.

10. Method of producing a bonded abrasive comprising the steps of consolidating abrasive grain produced by the process of claim 1 in a bonding matrix.

11. The process according to claim 1 wherein the tetragonal crystal structure of the zirconium oxide content is at least 90 wt.-%.

12. The process according to claim 4 wherein the melt is quenched in such a way as to achieve complete solidification in less than 3 seconds.

13. The process according to claim 1 wherein the silicon compounds content, expressed as silicon oxide is between 0.2 and 0.49 wt.-%.

14. A process for making an abrasive grain comprising:
   providing a mixture of source materials comprising $Al_2O_3$, $ZrO_2$, $TiO_2$ and $SiO_2$ in the presence of excess carbon as a reducing agent, wherein the amount of $SiO_2$ relative to the amount of $TiO_2$ in the mixture as defined by a ratio $SiO_2$ wt-%/$TiO_2$ wt-% is from 0.59 to 1.62 and wherein the amount of silicon oxide is from 2.0 to 5.7 wt-% relative to all of the source materials;
   heating the mixture to form a melt and exposing the melt to reducing conditions; and
   quenching the melt to a solid from, wherein the amount of $ZrO_2$ in the abrasive grain is between 20 and 50 wt-% with at least 85 wt.-% of the $ZrO_2$ in tetragonal crystal form, and the amount of silicon compounds in the abrasive grain, expressed as silicon oxide, is between 0.2 and 0.7 wt.-%.

15. The process according to claim 14 wherein the ratio $SiO_2$ wt-%/$TiO_2$ wt-% is from 0.59 to 1.18.

16. The process according to claim 14 wherein the quenching of the melt to solid form occurs in gaps that exist between cooling plates and is complete within 5 seconds.

17. The process according to claim 16 wherein the gaps of the cooling plates are from 3 mm to 5 mm.

18. The process according to claim 1 wherein the amount of silicon compounds, expressed as silicon oxide, is between 0.32 and 0.49 wt.-%.

19. The process according to claim 14 wherein the amount of silicon compounds, expressed as silicon oxide, is between 0.32 and 0.49 wt.-%.

* * * * *